(12) United States Patent
Sreegiriraju et al.

(10) Patent No.: US 8,725,848 B1
(45) Date of Patent: May 13, 2014

(54) MULTIPATH DISTRIBUTION

(75) Inventors: Saradhi S. Sreegiriraju, Fremont, CA (US); Ornat S. Freitas, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 557 days.

(21) Appl. No.: 12/895,184

(22) Filed: Sep. 30, 2010

(51) Int. Cl.
*G06F 15/177* (2006.01)
*G06F 15/173* (2006.01)

(52) U.S. Cl.
USPC ............................ 709/220; 709/221; 709/223

(58) Field of Classification Search
USPC .................. 709/220, 221, 222, 223
See application file for complete search history.

(56) References Cited

U.S. PATENT DOCUMENTS

| | | | |
|---|---|---|---|
| 5,257,374 A | 10/1993 | Hammer et al. | |
| 5,987,507 A | 11/1999 | Creedon et al. | |
| 6,026,425 A | 2/2000 | Suguri et al. | |
| 6,128,642 A | 10/2000 | Doraswamy et al. | |
| 6,438,551 B1 | 8/2002 | Holmskar | |
| 7,430,628 B2 | 9/2008 | Garg et al. | |
| 7,716,323 B2 | 5/2010 | Gole et al. | |
| 8,001,295 B2 * | 8/2011 | Strutt | 710/36 |
| 8,160,063 B2 | 4/2012 | Maltz et al. | |
| 2002/0138443 A1 * | 9/2002 | Schran et al. | 705/64 |
| 2003/0023705 A1 * | 1/2003 | Kim | 709/220 |
| 2003/0177208 A1 * | 9/2003 | Harvey, IV | 709/221 |
| 2003/0217156 A1 * | 11/2003 | Datta et al. | 709/227 |
| 2004/0025159 A1 | 2/2004 | Scheuermann et al. | |
| 2004/0198220 A1 | 10/2004 | Whelan et al. | |
| 2006/0259951 A1 * | 11/2006 | Forssell et al. | 726/1 |
| 2007/0088895 A1 | 4/2007 | Gustafson et al. | |
| 2007/0162673 A1 | 7/2007 | Garg et al. | |
| 2008/0104264 A1 | 5/2008 | Duerk et al. | |
| 2008/0215409 A1 | 9/2008 | Van Matre | |
| 2008/0270670 A1 | 10/2008 | Usami | |
| 2009/0199180 A1 | 8/2009 | Kresina | |
| 2010/0037029 A1 | 2/2010 | Scheuermann et al. | |
| 2010/0115332 A1 | 5/2010 | Zheng et al. | |
| 2010/0275207 A1 | 10/2010 | Radmilac et al. | |
| 2010/0285798 A1 * | 11/2010 | Matsuda | 455/426.1 |
| 2010/0333091 A1 | 12/2010 | Lin et al. | |
| 2011/0296234 A1 | 12/2011 | Oshins et al. | |

\* cited by examiner

*Primary Examiner* — Brian J Gillis
(74) *Attorney, Agent, or Firm* — Theodore A. Chen; Krishnendu Gupta

(57) ABSTRACT

A method, article of manufacture, and apparatus for processing data. In some embodiments, this includes an intermediary connecting to an initial interface, the intermediary receiving an optimal interface, the intermediary disconnecting from the initial interface, and the intermediary connecting to the optimal interface. In some embodiments, the intermediary may be a plug-in for an application on a client.

11 Claims, 6 Drawing Sheets

MULTIPATH DISTRIBUTION

CROSS REFERENCE TO RELATED APPLICATIONS

This application is related to co-pending U.S. patent application Ser. No. 12/895,198 for MULTIPATH FAILOVER and filed concurrently herewith, which is incorporated herein by reference for all purposes; and to co-pending U.S. patent application Ser. No. 12/895,219 for DYNAMIC LOAD BALANCING and filed concurrently herewith, which is incorporated herein by reference for all purposes; and to co-pending U.S. patent application Ser. No. 12/895,232 for EFFICIENT INTERFACE ADDITION and filed concurrently herewith, which is incorporated herein by reference for all purposes.

FIELD OF THE INVENTION

The present invention relates generally to data systems, and more particularly, to systems and methods of efficiently protecting and accessing data.

BACKGROUND OF THE INVENTION

Data systems typically have multiple access points or interfaces. For example, a server may have several ports or links that a client may connect to. To maximize efficiency and performance, it may be necessary to spread the client's load across the server's interfaces.

There have been some attempts at utilizing multiple interfaces to spread a client's load. One such method is link aggregation. However, link aggregation requires complex configuration of the network interface and does not scale very well.

There is a need, therefore, for an improved method, article of manufacture, and apparatus for protecting and accessing data in data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
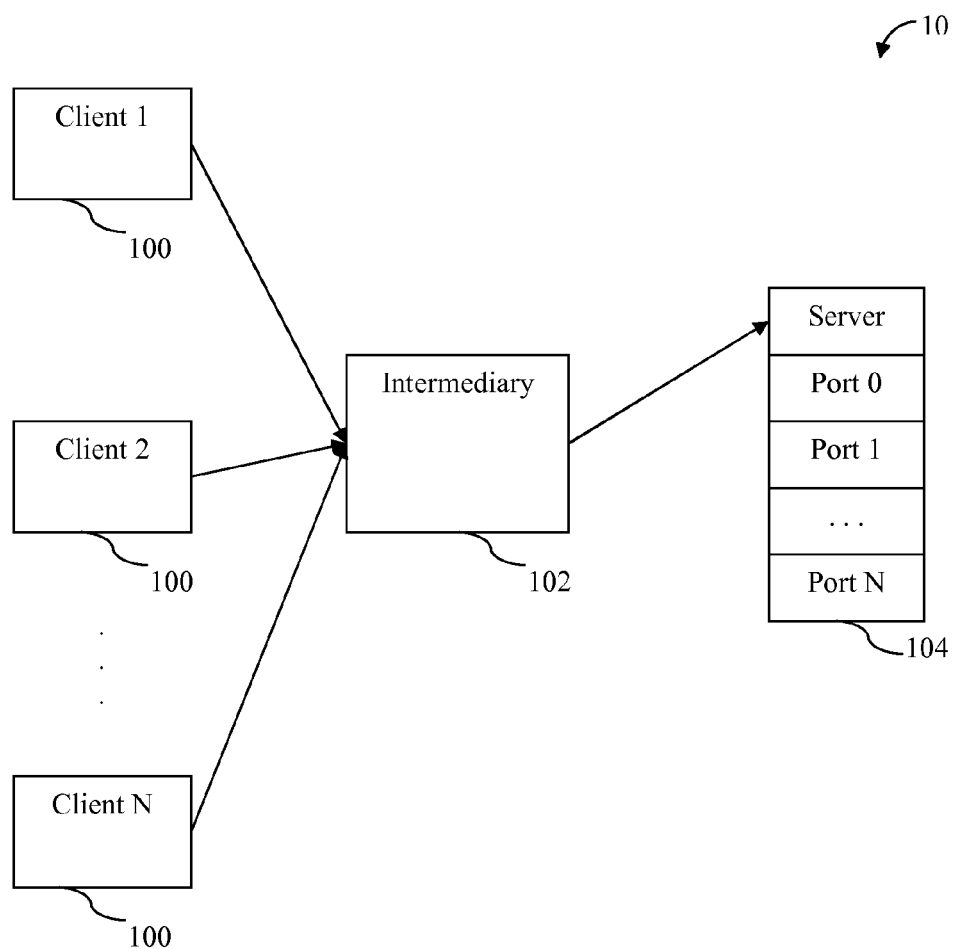
FIG. 1 is a diagram of a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates a data system in accordance with some embodiments. Data System 10 includes Clients 100, Intermediary 102, and Server 104. Clients 100 may be backup clients, such as a laptop, desktop, or a virtual machine. As illustrated by FIG. 1, there may be any number of clients. Server 104 may be a backup server that stores backup data of Clients 100. As illustrated by FIG. 1, Server 104 may have any number of ports or interfaces. Intermediary 102 handles communication between Clients 100 and Server 104 as described herein.

Though FIG. 1 illustrates only one server, Data System 10 may include multiple servers. Further, these servers need not be physical. These servers may be virtual servers residing in a physical server, or may be a single virtual server residing across multiple physical servers. Similarly, Clients 100 may be virtual clients residing across multiple physical clients.

Though FIG. 1 illustrates Intermediary 104 to be external to Clients 100 and Server 104, Intermediary 104 may reside inside clients or servers. Further, there may be multiple intermediaries in Data System 10. In some embodiments, Intermediary 104 may be a plug in for a backup application in each Client 100. In some embodiments, Intermediary 104 may be an application in Server 104. Having an intermediary has many benefits. For example, in cases where the intermediary is a plug in, the host clients may be heterogeneous. In other words, the intermediary may operate in a wide range of operating environments. This allows for different operating systems and applications to utilize the intermediary and the enhanced techniques described herein without any additional configuration changes (e.g. many of the processes behind the intermediary are transparent to the host).

In some embodiments, a client may be a backup client and a server may be a backup server. When the client wishes to perform a backup, the client may send data to the server. Transparent to the user and the backup application is Intermediary 104. In some embodiments, Intermediary 104 may be a plug-in for a backup application. The plug-in may receive the data from client (or from the backup application), and may connect to the server, relaying information between the server and the client. It should be noted that in some embodiments, the plug-in may be application independent.

The intermediary may connect to the server in a variety of methods. In some embodiments, there is a designated port or interface in the server which the intermediary connects to. For example, Port 0 in the server may be designated the port in which the intermediary connects to. This may be referred to as an initial port.

In some embodiments, there may be multiple "initial ports," or initial interfaces, which the intermediary may connect to. These multiple initial ports may be a grouped together to form a group or collection of initial ports. This may be preferable when there are a large number of ports available in the server. This allows the intermediary to have backup initial ports in case the first initial port fails. For example, suppose a server has 10 ports. Ports 0 and 1 may be assigned to an "initial port" group. In some embodiments, a plug-in may be configured with the information regarding the initial interface or initial interface group (e.g. IP address, link address, among others). At first, the intermediary may attempt to connect to Port 0. However, if there is a hardware failure or other condition which would not allow the intermediary to connect to Port 0, the intermediary may switch to connect to Port 1.

Determining when to switch ports may be decided on a case by case basis. In some embodiments, a "time-out" response may be designated after the intermediary has received no response from a port in five minutes. After receiving the "time-out," the intermediary may attempt to connect to another port. Further, it may be preferable to have different time-out periods for different scenarios. For example, during a server restart, it may be preferable to allow for a longer time-out period.

Once the intermediary connects to the initial port, the server may designate an optimal port for the intermediary or client to connect to. The server may determine the optimal port through a variety of methods. In some embodiments, the server may keep a counter of operations on each of the server's ports. For example, an operation may be a job in a backup or restore process. Ports with a "low" counter may indicate a lower level of activity, and may be considered an optimal port. Similarly, ports with a "high" counter may indicate a higher level of activity, and may not be considered an optimal port.

Figure 3:
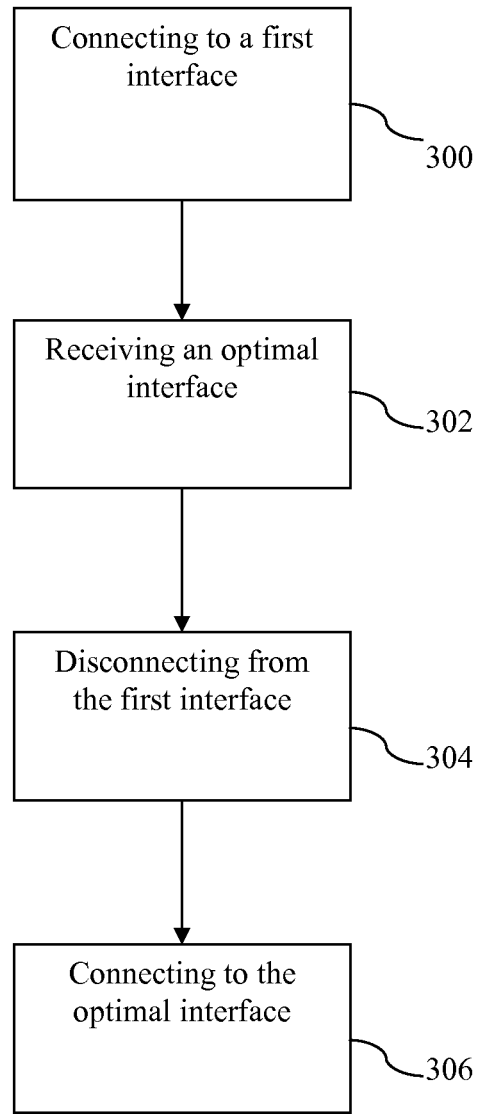
FIG. 3 is a flowchart of a method to process data in accordance with some embodiments.

FIG. 3 illustrates a method to connect to an optimal interface in accordance with some embodiments. In step 300, a first interface is connected to. In step 302, an optimal interface is received. In step 304, the first interface is disconnected. In step 306, the optimal interface is connected.

In some embodiments, the counters may be incremented when the server sees a "start job." For example, if a client desires to begin a backup job, a backup job on a port may be initiated and the server would increment the port's counter by 1. Similarly, in some embodiments, the counters may be decremented when the server sees an "end job." For example, if a restore job has been completed on a port, the server would decrement the port's counter by 1. This allows for the server to maintain an accurate counter at any given point in time with minimal overhead.

Once an optimal port has been identified and made known to the intermediary, the intermediary may, in some embodiments, disconnect from the initial port and connect to the optimal port. In this way, the intermediary is only briefly connected to the initial port. This allows for many clients or many intermediaries to connect to the initial port. It should be noted that a group of optimal ports may be identified. This group of optimal ports may include alternate ports, similar to the initial port group discussed herein. For example, if an optimal port group contained ports 3, 4, and 5, but port 3 was down due to a hardware failure, the intermediary may attempt to connect to port 4 after receiving a time-out from port 3.

Figure 2A:
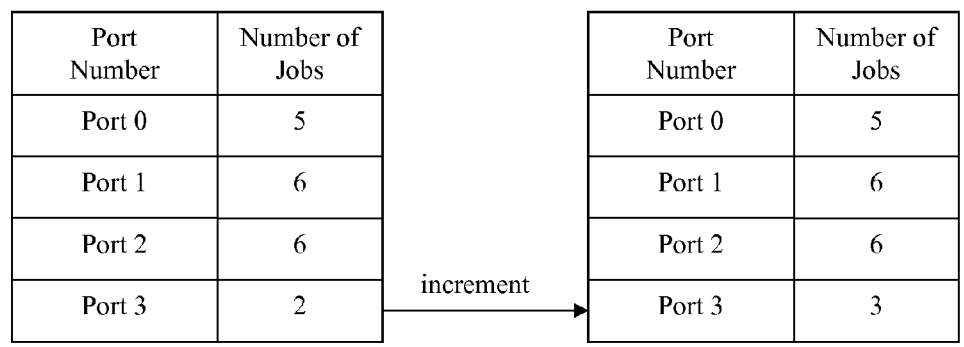
FIGS. 2A and 2B are tables illustrating the distribution of port jobs in accordance with some embodiments.
Figure 2B:
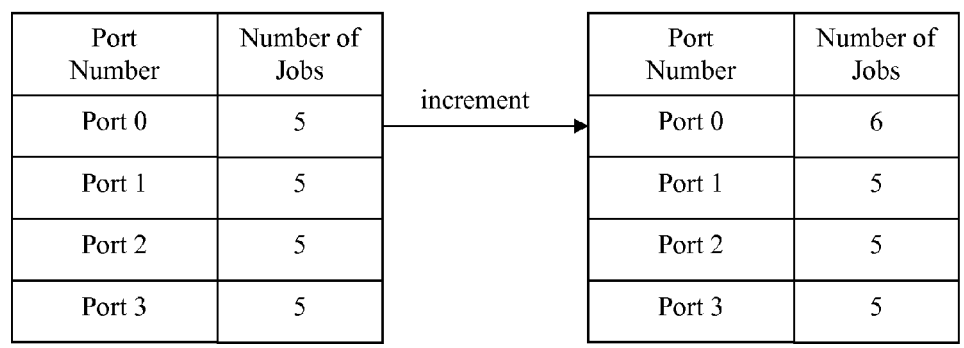

As discussed herein, once the intermediary connects to the optimal port and begins a job, the server may increment the optimal port's counter by 1. This may affect the next job request's optimal port. For example, FIGS. 2A and 2B include tables with a list of ports and each port's number of jobs. In FIG. 2A, Port 3 has the lowest count. When the server receives a new job request, the server may determine that Port 3 is the optimal port due to its lowest counter. When the job starts, the server will increment Port 3's counter by 1. When the server receives another job request, the server may again determine that Port 3 is the optimal port due to its lowest counter. In this case, Port 3 is the optimal port for both job requests. In FIG. 2B, all the ports have the same count (5). In some embodiments, the server may choose to assign the first port as the optimal port. In some embodiments, when the count is the same for all ports, the optimal port may be chosen randomly. In FIG. 2B, Port 0 has been chosen as the optimal port, and its counter has been incremented by 1. When another job request comes, Port 0 will have a count of 6, whereas all the other ports will have a count of 5. Port 0 now no longer has the lowest count value, so it will not be considered an optimal port for the job request.

Ports need not be identical. For example, one port may have a speed of 1 GbE, and another may have a speed of 10 GbE. In some embodiments, counters may be given different weight in port with different speeds. Using the example above, the 1 GbE port may have 10 jobs, while the 10 GbE port may have 15 jobs. Even though the 10 Gbe port's counter may be higher, the counter may be given a different weight than the 1 GbE port, and actually be considered to be a lower counter (e.g. the 10 GbE port may be an optimal port).

In some embodiments, a backup process may have multiple concurrent jobs. For example, the backup process may have several read jobs and write jobs. An intermediary may request an optimal port for each job. For example, suppose a client has fifty jobs. For each of the fifty jobs, the intermediary may request an optimal port. Depending on the counters of the server ports, each job may utilize a different port, some jobs may utilize the same port, or all jobs may utilize the same port. To illustrate, suppose a server has 11 ports, Ports 0-10: Port 0 is designated as the initial port, and Ports 1-10 are available to jobs. Ports 1-10 each have a current counter of 0. At the beginning of a backup operation, the intermediary will connect to Port 0, and request an optimal port for the first of the fifty jobs. Since all 10 ports have a counter of 0, the server may instruct the intermediary to connect to Port 1. When the first job starts on Port 1, the server may increment the counter of Port 1 from 0 to 1. For the second of the fifty jobs, the intermediary will again connect to Port 0, and request an optimal port for the second of the fifty jobs. Since Port 1 has a counter of 1, and Ports 2-10 have a counter of 0, the server may instruct the intermediary to connect to Port 2, and upon starting the second job, increment the counter of Port 2 from 0 to 1, and so on. Using this example, the client may have 10 jobs running concurrently, and thus, be able to utilize 10 connections. As illustrated by this example, bandwidth scales linearly with the number of connections, (e.g. Nx, where N is the number of interfaces). This provides better performance than conventional methods, such as link aggregation, which only yield approximately 1.25x for 2 interfaces and approximately 2.5x for 4 interfaces.

In some embodiments, it may be preferable to dynamically balance the job load across the ports. In some embodiments, jobs may not start or end at the same time. Further, some jobs may take longer than other jobs to complete. For example, there may be 12 jobs running across Ports 1-3. Port 1 has 4 jobs running on it, Port 2 has 4 jobs running on it, and Port 3 has 4 jobs running on it. Suppose that Port 1's jobs are relatively short, and all four of Port 1's jobs are completed before even 1 of Port 2 or Port 3's jobs are completed. Port 1 now has no jobs running on it, Port 2 still has 4 jobs running on it, and Port 3 has 4 jobs running on it. In some embodiments, it may be preferable to reallocate Port 2 and Port 3's jobs to Port 1. For example, 2 of Port 2's jobs may be moved to Port 1, and 1 of Port 3's jobs may be moved to Port 1. This will result in Port 1 now having 3 jobs, Port 2 having 2 jobs, and Port 3 having 3 jobs, which is a more balanced load. In this way, the client will have access to 3 ports throughout more of the operation, rather than only 2 ports after the completion of Port 1's jobs. Note that if further jobs are available (e.g. clients have more jobs for the server), it may not be preferable to distribute the loads from Port 2 and Port 3 to Port 1. In some embodiments, it may be preferable for Port 2 and Port 3 to keep their current loads, and add all new jobs to Port 1 until Port 1's counter meets or exceeds Ports 2 and 3.

Figure 5:
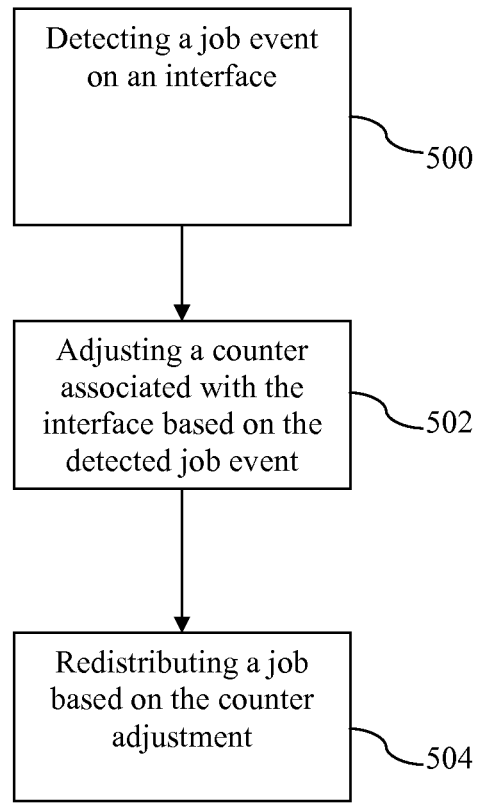
FIG. 5 is a flowchart of a method to manage interfaces in accordance with some embodiments.

FIG. 5 illustrates a method to manage jobs on interfaces in accordance with some embodiments. In step 500, a job event on an interface is detected. In step 502, a counter associated with the interface is adjusted based on the detected job event. In step 504, a job is redistributed based on the counter adjustment (e.g. jobs from other interfaces may be moved to the interface if the interface's counter is decremented sufficiently.)

Enhanced protection may also be provided in cases of port failure or other situations in which a port is no longer accessible. For example, suppose a client has 10 jobs currently running on a server. The jobs are running through ports 1, 2, and 3. Port 1 has 4 jobs, Port 2 has 3 jobs, and Port 3 has 3 jobs. In some embodiments, if a problem is detected with Port 1 (e.g. time-out, hardware failure, etc.) the intermediary may disconnect from Port 1 and connect to the initial port to request a new optimal port. In some embodiments, the server may automatically reassign the jobs in Port 1 and distribute the jobs among the remaining ports (e.g. Ports 2 and 3). In this example, the server may move 2 of the jobs from Port 1 to Port 2 and the other 2 jobs from Port 1 to Port 3. This will result in 0 jobs on Port 1 (failed port), 5 jobs on Port 2, and 5 jobs on Port 3.

Figure 4:
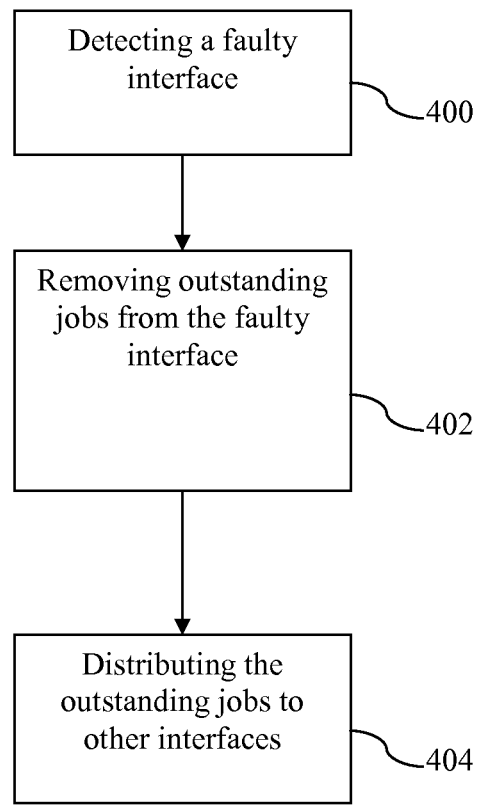
FIG. 4 is a flowchart of a method to manage interfaces and faulty interfaces in accordance with some embodiments.

FIG. 4 illustrates a method to manage interfaces and faulty interfaces in accordance with some embodiments. In step 400, a faulty interface is detected. This may be a failed interface, or may be a failing interface, or may be a user reserving the interface and restricting the interface's accessibility. For example, a time-out response may have been received. In step 402, outstanding jobs from the faulty interface are removed. In step 404, the outstanding jobs are distributed to other interfaces.

Ports which are unavailable need not be due to hardware failure. In some embodiments, it may be preferable for a user to make a port unavailable. This may be due to the user's desire to reserve a port or multiple ports for other tasks, such as replication, among others. The user may designate a port "reserved" at any time. For example, the user may designate a reserved port prior to the commencement of a job, or during the job. When the user designates a reserved port which currently has a job running on the reserved port (e.g. is an optimal port for a job), policy may dictate what action the server should take. For example, one policy may be to allow the port to finish all outstanding jobs before taking on reserved status and not take on any further jobs. Another policy may be to immediately redistribute the jobs among the server's other ports, in a manner similar to moving a failed port's jobs to other ports, and not take on any further jobs. The policy taken may depend on the needs of the user.

Similarly, users may un-reserve ports, or new ports may be added or opened on a server. In such cases, it may be preferable to balance the load across all ports, including the now newly accessible ports. For example, Ports 1, 2 and 3 may each have 3 jobs running. If a new port, Port 4, is now accessible, it may make sense to move some of the jobs on Ports 1, 2 and 3 to Port 4. For example, 1 job from Port 1, 1 job from Port 2, and 0 jobs from Port 3 may be moved to Port 4. This will result in Port 1 running 2 jobs, Port 2 running 2 jobs, Port 3 running 3 jobs, and new Port 4 running 2 jobs. In some embodiments, it may be preferable for Ports 1, 2 and 3 to keep their current jobs, and add all new jobs on Port 4 in a manner consistent with maintaining a balance load across all the ports.

Figure 6:
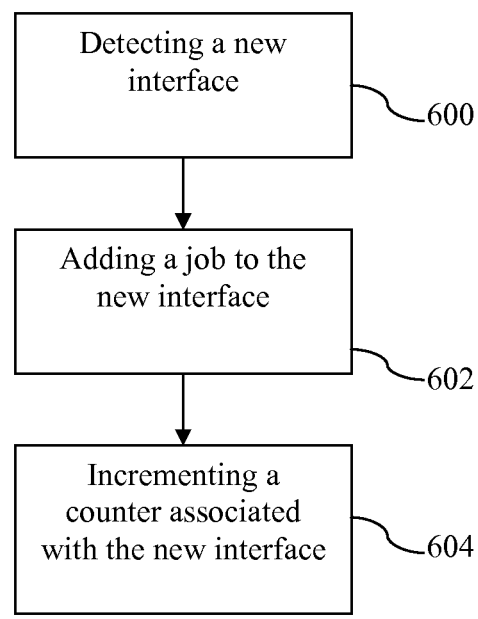
FIG. 6 is a flowchart of a method to manage interfaces in accordance with some embodiments.

FIG. 6 illustrates a method to manage interfaces in accordance with some embodiments. In step 600, a new interface is detected. This new interface may be an actual new interface, or may be a newly un-reserved interface, among others. In step 602, a job is added to the new interface. In step 605, a counter associated with the new interface is incremented.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing data, comprising:
   connecting to an initial interface on a server, wherein the initial interface includes a group of initial interfaces, wherein the group of initial interfaces includes a first initial interface and a second initial interface;
   connecting to the second initial interface when the first initial interface is not accessible based on a time-out response, said time-out response varying based on a scenario;
   receiving an optimal interface, wherein the optimal interface includes a group of optimal interfaces, wherein the group of optimal interfaces includes a first optimal interface with a first counter value and a second optimal interface with a second counter value, wherein the first counter value is the number of jobs operating on the first optimal interface and the second counter value is the number of jobs on the second optimal interface;
   determining to connect to the second optimal interface when the first counter is greater than the second counter;
   disconnecting from the initial interface; and
   connecting to the first or second optimal interface on the server based on the determination.

2. The method as recited in claim 1, further comprising initiating a first job on the connected first optimal interface and initiating a second job on the connected second optimal interface.

3. The method as recited in claim 2, wherein the first job is a backup job.

4. The method as recited in claim 2, wherein the first job and the second job are concurrently running.

5. The method as recited in claim 1, wherein connecting to an initial interface on a server includes using a plug-in to connect to the initial interface on the server.

6. The method as recited in claim 5, wherein the plug-in resides in a client.

7. A system for processing data, comprising a non-transitory computer readable medium and a processor executing a process, said process comprising:
   connecting to an initial interface on a server, wherein the initial interface includes a group of initial interfaces, wherein the group of initial interfaces includes a first initial interface and a second initial interface;
   connecting to the second initial interface when the first initial interface is not accessible based on a time-out response, said time-out response varying based on a scenario;
   receiving an optimal interface, wherein the optimal interface includes a group of optimal interfaces, wherein the group of optimal interfaces includes a first optimal interface with a first counter value and a second optimal interface with a second counter value, wherein the first counter value is the number of jobs operating on the first optimal interface and the second counter value is the number of jobs on the second optimal interface;
   determining to connect to the second optimal interface when the first counter is greater than the second counter;
   disconnecting from the initial interface; and
   connecting to the first or second optimal interface on the server based on the determination.

8. A computer program product for processing data, comprising a non-transitory computer usable medium having machine readable code embodied therein for:
   connecting to an initial interface on a server, wherein the initial interface includes a group of initial interfaces, wherein the group of initial interfaces includes a first initial interface and a second initial interface;
   connecting to the second initial interface when the first initial interface is not accessible based on a time-out response, said time-out response varying based on a scenario;
   receiving an optimal interface, wherein the optimal interface includes a group of optimal interfaces, wherein the group of optimal interfaces includes a first optimal interface with a first counter value and a second optimal interface with a second counter value, wherein the first counter value is the number of jobs operating on the first optimal interface and the second counter value is the number of jobs on the second optimal interface;
   determining to connect to the second optimal interface when the first counter is greater than the second counter;
   disconnecting from the initial interface; and
   connecting to the first or second optimal interface on the server based on the determination.

9. The computer program product as recited in claim 8, further comprising machine readable code for initiating a first job on the connected first optimal interface and initiating a second job on the connected second optimal interface.

10. The computer program product as recited in claim 8, wherein the first job is a backup job.

11. The computer program product as recited in claim 10, wherein the first job and the second job are concurrently running.

* * * * *